(12) United States Patent
Araki et al.

(10) Patent No.: US 7,307,942 B2
(45) Date of Patent: Dec. 11, 2007

(54) INFORMATION RECORDING MEDIUM, INFORMATION REPRODUCING APPARATUS, INFORMATION RECORDING APPARATUS, AND INFORMATION RECORDING/REPRODUCING APPARATUS

(75) Inventors: Yoshitsugu Araki, Tsurugashima (JP); Mitsuru Sato, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 283 days.

(21) Appl. No.: 10/413,999

(22) Filed: Apr. 16, 2003

(65) Prior Publication Data
US 2003/0198172 A1 Oct. 23, 2003

(30) Foreign Application Priority Data
Apr. 17, 2002 (JP) ............................ P2002-115329
Jun. 4, 2002 (JP) ............................ P2002-163416

(51) Int. Cl.
*G01B 7/24* (2006.01)
(52) U.S. Cl. ................................ 369/275.4; 369/112.23
(58) Field of Classification Search ..................... None
See application file for complete search history.

(56) References Cited

U.S. PATENT DOCUMENTS

| | | | | |
|---|---|---|---|---|
| 5,872,750 | A * | 2/1999 | Satoh | 369/30.22 |
| 6,054,199 | A * | 4/2000 | Sugiyama et al. | 369/275.4 |
| 6,058,095 | A * | 5/2000 | Yamamoto et al. | 369/112.23 |
| 6,091,700 | A * | 7/2000 | Kobayashi | 369/275.4 |
| 6,618,343 | B1 * | 9/2003 | Saitoh et al. | 369/112.01 |
| 6,721,265 | B1 * | 4/2004 | Fujii et al. | 369/275.4 |
| 2002/0001274 | A1 * | 1/2002 | Nakajima et al. | 369/275.4 |
| 2002/0021657 | A1 * | 2/2002 | Lee et al. | 369/275.4 |
| 2002/0057642 | A1 * | 5/2002 | Kim et al. | 369/112.24 |
| 2002/0186636 | A1 * | 12/2002 | Onagi et al. | 369/53.18 |

FOREIGN PATENT DOCUMENTS

| | | |
|---|---|---|
| CN | 1226730 | 8/1999 |
| JP | 10-283683 | 10/1998 |
| JP | 11-250506 | 9/1999 |
| JP | 2002-008269 | 1/2002 |

* cited by examiner

*Primary Examiner*—William R. Korzuch
*Assistant Examiner*—Nathan Danielsen
(74) *Attorney, Agent, or Firm*—Drinker Biddle & Reath LLP

(57) ABSTRACT

The depth of pits is determined by a trade-off between the level of a push-pull signal used for servo application by a push-pull method and the level of an RF signal as a reproduced signal of information. The depth d is set to be the optimum for a disk system, which has a refractive index n of a medium, an optical wavelength λ, and an optical system with a NA (Numerical Aperture) of 0.75. The most suitable depth d for both the push-pull signal level and the RF signal level falls within a range of $\lambda/5.5n \leq d \leq \lambda/4.7n$, the second most suitable depth d falls with a range of $\lambda/5.5n \leq d \leq \lambda/4.5n$, and the depth d as the widest standard falls within a range of $\lambda/8n \leq d \leq \lambda/4.5n$.

10 Claims, 11 Drawing Sheets

| DISK TYPE | PIT DEPTH (d) $\lambda$: OPTICAL WAVELENGTH  $n$: REFRACTIVE INDEX | |
|---|---|---|
| | LOWER LIMIT | UPPER LIMIT |
| No 1 | $\lambda/8n$ | $\lambda/4.5n$ |
| No 2 | $\lambda/5.5n$ | $\lambda/4.5n$ |
| No 3 | $\lambda/8n$ | $\lambda/4.7n$ |
| No 4 | $\lambda/5.5n$ | $\lambda/4.7n$ |

○ PERTURBATIVE CONDITION A
△ PERTURBATIVE CONDITION B

| PIT DEPTH d | $\lambda/4n$ | $\lambda/4.3n$ | $\lambda/4.8n$ | $\lambda/5.4n$ |
|---|---|---|---|---|
| PUSH-PULL MODULATION DEGREE | 0.112 | 0.127 | 0.137 | 0.134 |
| PLAYBACK ABILITY MARGIN A (dB) | 1.33 | 2.09 | 4.56 | 5.89 |
| PLAYBACK ABILITY MARGIN B (dB) | — | 2.09 | 3.04 | 4.75 |

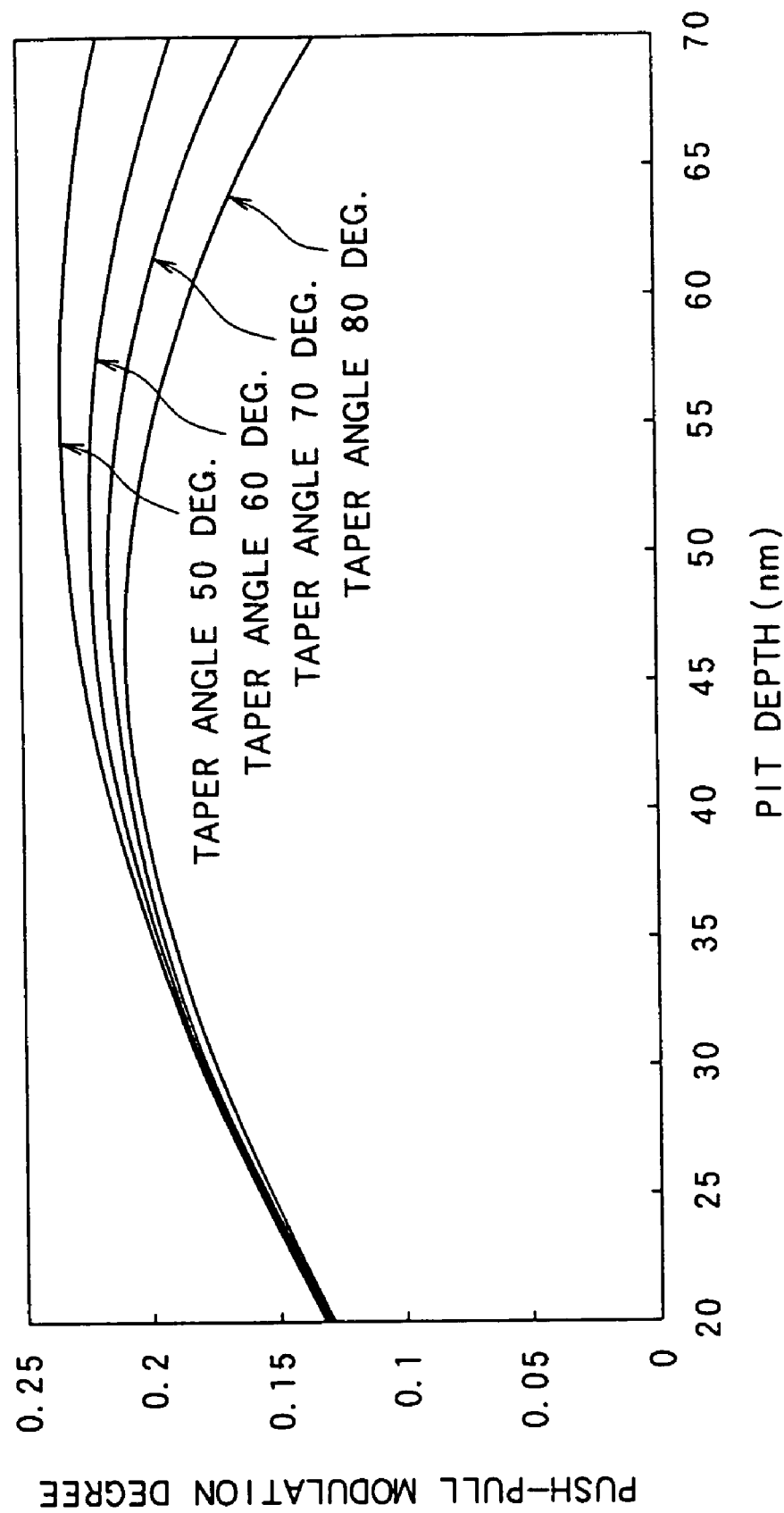

INFORMATION RECORDING MEDIUM, INFORMATION REPRODUCING APPARATUS, INFORMATION RECORDING APPARATUS, AND INFORMATION RECORDING/REPRODUCING APPARATUS

BACKGROUND OF THE INVENTION

1. Field of the Invention

The present invention belongs to the technical field of information recording media, such as optical disks capable of high-density recording or high-capacity recording, and the technical field of information reproducing apparatuses, information recording apparatuses, and information recording/reproducing apparatuses, capable of information reproduction and information recording from and on the information recording media.

2. Related Background Art

Conventionally, the development of information recording media for high-density information recording and mass information storage, and the development of information recording apparatuses and reproducing apparatuses used with the information recording media have been underway. Especially, with the development of information society, not only the amount of information processed but also mobile applications or portable use increase to increase the demand for compact, high-capacity information recording media. Under these circumstances, use of relatively easy-to-handle optical disks for optical recording and reproduction, such as CD-ROM (Compact Disc-Read Only Memory), MD (Mini Disc), and DVD-ROM (Digital Versatile-Read Only Memory), is increasing.

The recording density or recording capacity of these optical disks is determined by certain factors. The factors include kind of light used for recording and reproduction, for example wavelength of semiconductor laser, NA (Numerical Aperture) of an optical system practically usable for the wavelength, shape and depth of a depression or projection, or pit, corresponding to recorded information, and quality of an error signal obtained from the pit for control of the apparatus.

For example, for the conventional optical disk, the depth of a groove of a track or the depth of a pit is set to $\lambda/4n$ at which a signal to be reproduced as information from the pit or RF signal rises to its maximum level. On the other hand, a push-pull signal as an error signal for servo application cannot be detected at $\lambda/4n$, and rises to its maximum level at $\lambda/8n$. In view of the above two conditions, a value close to $\lambda/6n$ has been used for the actual depth of a pit. It should be noted that $\lambda$ is the wavelength of laser and n is the refractive index of a recording medium used.

However, according to the research by the inventors, when an optical system, for example with a NA of 0.75 or greater, that is, with a high NA lens is adopted as the reproduction optical system in an optical disk apparatus in order to increase the recording density, optical disks with conventional pit depths (close to $\lambda/6n$) cause a technical problem of making it difficult to generate both the RF signal and the push-pull signal efficiently. Especially, when blue light laser with a short wavelength is used as the light source, the conventional optical system with an NA lens of less than 0.75 and the optical disk with the conventional pitch depth (close to $\lambda/6n$) make it difficult to generate both the RF signal and the push-pull signal efficiently as signals of great magnitude.

SUMMARY OF THE INVENTION

It is therefore an object of the present invention to provide an information recording medium suitable for high recording density and high recording capacity and capable of generating an RF signal and a push-pull signal the magnitude of which is great enough for an optical disk apparatus using an optical system with an NA of 0.75 or greater, an information reproducing apparatus for reproducing information recorded on the information recording medium, an information recording apparatus for recording information on the information recording medium, and an information recording/reproducing apparatus for performing both recording and reproduction of information on and from the information recording medium.

The above object of the present invention can be achieved by an information recording medium of the present invention. In the present invention, the information recording medium is irradiated with an optical beam through an optical system with an NA of 0.75 or greater to reproduce information and record the information on the recording part as pits. Further, if the optical wavelength of the optical beam is $\lambda$, the refractive index of the recording part is n, and the depth d of the pits is d, the depth d of the pits falls within a range of a lower limit of $\lambda/8n$ to an upper limit of $\lambda/4.5n$ represented as: $\lambda/8n \leq d \leq \lambda/4.5n$.

According to the information recording medium of the invention, the depth d of a pit for recording information is defined within a range of $\lambda/8n$ or more to $\lambda/4.5n$ or less, that is, $\lambda/8n \leq d \leq \lambda/4.5n$. Such a pit may be formed in either a depression shape or a projection shape on a recording part as viewed from the incident side of an optical beam. The "depth d" of the pit on the recording part is accounted for with respect to one side, and it can also be dealt as the height of the pit with respect to the reverse side.

According to the research by the inventors on information reproducing apparatuses, information recording apparatuses, and information recording/reproducing apparatuses, such as optical disk apparatuses using an optical system, for example with an NA of 0.75 or greater, that is, with a high NA lens, it is confirmed that as the pit is deeper, its depth looks shallower and a push-pull signal as an error signal can be obtained even at $\lambda/4n$. This phenomenon is also confirmed by vector analysis. Under the aforementioned condition that the depth d falls within the range of $\lambda/8n \leq d \leq \lambda/4.5n$, an RF signal as an reproduced signal of information recorded on the information recording medium and the push-pull signal as a control signal for the optical system can both be outputted as sufficiently large values. Semiconductor laser may be used, for example, as the light source of the optical system having such an optical wavelength $\lambda$. Especially it is preferable to use semiconductor laser emitting at a sort wavelength, for example a beam of blue light, in response to the demand for high recording density. According to the invention, even such a beam of blue light is enough to obtain both the RF signal and the push-pull signal of sufficient magnitude.

Consequently, a high-density, high-capacity information recording medium capable of generating both the RF signal and the push-pull signal of sufficient magnitude can be realized even in the optical disk apparatus using the optical system with the NA of 0.75 or greater, for example.

In one aspect of the information recording medium of the invention, the lower limit for the depth d of pits is set to $d=\lambda/5.5n$.

According to this aspect, the lower limit for the depth d of pits is $d=\lambda/5.5n$, and the depth d of pits is defined within a range of λ/4.5n or less, that is, λ/5.5n≦d≦λ/4.5n. Under this condition, the RF signal as the reproduced signal of information and the push-pull signal as the control signal for the optical system can be outputted at preferable levels.

In another aspect of the present invention, the upper limit for the depth d of the pits is set to d=λ/4.7n.

According to this aspect, the upper limit for the depth d of pits is d=λ/4.7n, and the depth d of pits is defined within a range of λ/8n or more to λ/4.7n or less, that is, λ/8n≦d≦λ/4.7n. Under this condition, the RF signal as the reproduced signal of information and the push-pull signal as the control signal for the optical system can be outputted at more preferable levels.

It is further preferable to define the depth d of pits within a range of λ/5.5n or more to λ/4.7n or less, that is, λ/5.5n≦d≦λ/4.7n. Under this condition, the RF signal as the reproduced signal of information and the push-pull signal as the control signal for the optical system can be outputted at further more preferable levels.

In further aspect of the present invention, if the average width of the pits is W [nm], the taper angle of the pits is θ[deg.], and the actual depth of the pits is D [nm], the depth d of the pits is determined as an apparent depth represented as: d=W×D/(W+D/tan θ).

According to this aspect, when pits corresponding to information to be recorded are formed on a substrate in a tapered shape, an apparent depth d of pits is given by the above equation. It should be noted that the pits may be formed on the substrate in either a projection shape or a depression shape.

In further aspect of the present invention, the information recording medium is irradiated with the optical beam through the optical system with the NA of 0.75 or greater to reproduce information and record the information on the recording part as pits. Further, the push-pull modulation degree is 0.13 or more.

According to this aspect, when the apparent depth d of the pits is defined within a range of λ/5.5n≦d≦λ/4.7n, if the push-pull modulation degree is 0.13 or more, the push-pull signal as the control signal for the optical system can be outputted as the optimum value.

The above object of the present invention can be achieved by an information reproducing apparatus of the present invention. In the present invention, the information reproducing apparatus reproduces information recorded on the above-mentioned information recording medium of the present invention (including each aspect of the present invention). Further, the information reproducing apparatus is provide with: a reproduction optical device for irradiating the recording part with an optical beam for reproduction through the optical system with the NA of 0.75 or greater and receiving light from the recording part based on the optical beam; a reproduction control device for controlling the reproduction operation of the reproduction optical device; and a signal demodulating device for demodulating a light-receiving signal generated by the reproduction optical device.

According to the information reproducing apparatus of the invention, the reproduction optical device irradiates the recording part of the information recording medium with the optical beam for reproduction, and receives light from the recording part based on the light beam to generate a light-receiving signal. The "light from the recording part based on the light beam" is for example reflected light, but it may also be transmitted light or diffracted light. Subsequently, the signal demodulating device demodulates the light-receiving signal generated by the reproduction optical device. Since the reproduction optical device irradiates the information recording medium of the invention, which meets the condition of λ/8n≦d≦λ/4.5n, through the optical system with the NA of 0.75 or greater, a push-pull signal and a RF signal of great magnitude can be generated from the light-receiving signal generated from the reproduced signal.

The information reproducing apparatus also includes a device for operating the information reproducing apparatus, a device for displaying the operational state of the information reproducing apparatus, and the like as appropriate in a general-purpose manner.

In another aspect of the information reproducing apparatus of the present invention, the reproduction control device is further provided with is a tracking servo device for performing tracking servo based on the light-receiving signal generated by the reproduction optical device.

According to this aspect, a sufficiently great tracking signal is generated based on the light-receiving signal to make possible high-performance tracking.

In this aspect, the tracking servo device may be configured to perform tracking servo by a push-pull or differential push-pull method.

According to this configuration, an RF signal and a push-pull signal of sufficient magnitude can be obtained based on the light-receiving signal. Further, the push-pull signal of such great magnitude makes possible high-performance tracking.

The above object of the present invention can be achieved by an information recording apparatus of the present invention. In the present invention, the information recording apparatus records information on the above-mentioned information recording medium of the present invention (including each aspect of the present invention). Further, the information recording apparatus is provided with: a recording optical device for irradiating the recording part with an optical beam for recording through the optical system with the NA of 0.75 or greater; a signal modulating device for converting an information signal, indicative of information to be recorded, into a recording signal; and a recording control device for inputting the recording signal converted by the signal modulating device into the recording optical device to control the recording operation.

According to the information recording apparatus of the invention, the signal modulating device converts the information signal, indicative of information to be recorded, into the recording signal, and the recording control device inputs the recording signal into the recording optical device. The recording optical device irradiates the recording part of the information recording medium with the optical beam for recording under the control of the recording control device. Since the recording optical device irradiates the information recording medium of the invention with the optical beam through the optical system with the NA of 0.75 or greater, high-density recording or high-capacity recording is made possible using a laser beam of blue light, for example. In this case, the control of laser power and selection of thickness of the recording medium are done to perform recording in such a manner as to meet the condition of λ/8n≦d≦by λ/4.5n by a technique such as to blow off a certain thickness of the recording medium with laser power during recording.

The information recording apparatus also includes a device for operating the information recording apparatus, a device for displaying the operational state of the information recording apparatus, and the like as appropriate in a general-purpose manner.

The above object of the present invention can be achieved by an information recording/reproducing apparatus of the present invention. In the present invention, the information recording/reproducing apparatus records and reproducing information on and from the above-mentioned information recording medium of the present invention (including each aspect of the present invention). In the present invention, the information recording/reproducing apparatus is provided with: a recording/reproduction optical device, which irradiates the recording part with an optical beam for reproduction through the optical system with the NA of 0.75 or greater and receives light from the recording part based on the optical beam to generate a light -receiving signal during reproduction, and irradiates the recording part with an optical beam for recording during recording; a reproduction control device for controlling the reproduction operation of the recording/reproduction optical device; a signal demodulating device for demodulating the light-receiving signal generated by the recording/reproduction optical device; a signal modulating device for converting information signal, indicative of information to be recorded, into a recording signal; and a recording control device for inputting the recording signal converted by the signal modulating device into the recording/reproduction optical device to control the recording operation.

According to the information recording/reproducing apparatus of the invention, recording is done in the same manner as by the aforementioned information recording apparatus of the invention, and reproduction is done in the same manner as by the aforementioned information reproducing apparatus. Since an RF signal and a push-pull signal of great magnitude are obtained based on the light-receiving signal, information can be recorded and reproduced at high density and high capacity.

The information recording/reproducing apparatus can be realized in several aspects in the same manner as the aforementioned information reproducing apparatus of the invention.

The operation and other advantages of the invention will be apparent from preferred embodiments to be described later.

BRIEF DESCRIPTION OF THE DRAWINGS

FIG. 10 is a curve chart showing a relationship between pith depth and push-pull modulation degree when choosing taper angles as parameters;

DETAILED DESCRIPTION OF THE PREFERRED EMBODIMENTS (Embodiment of Information Recording Medium)

Figure 1:
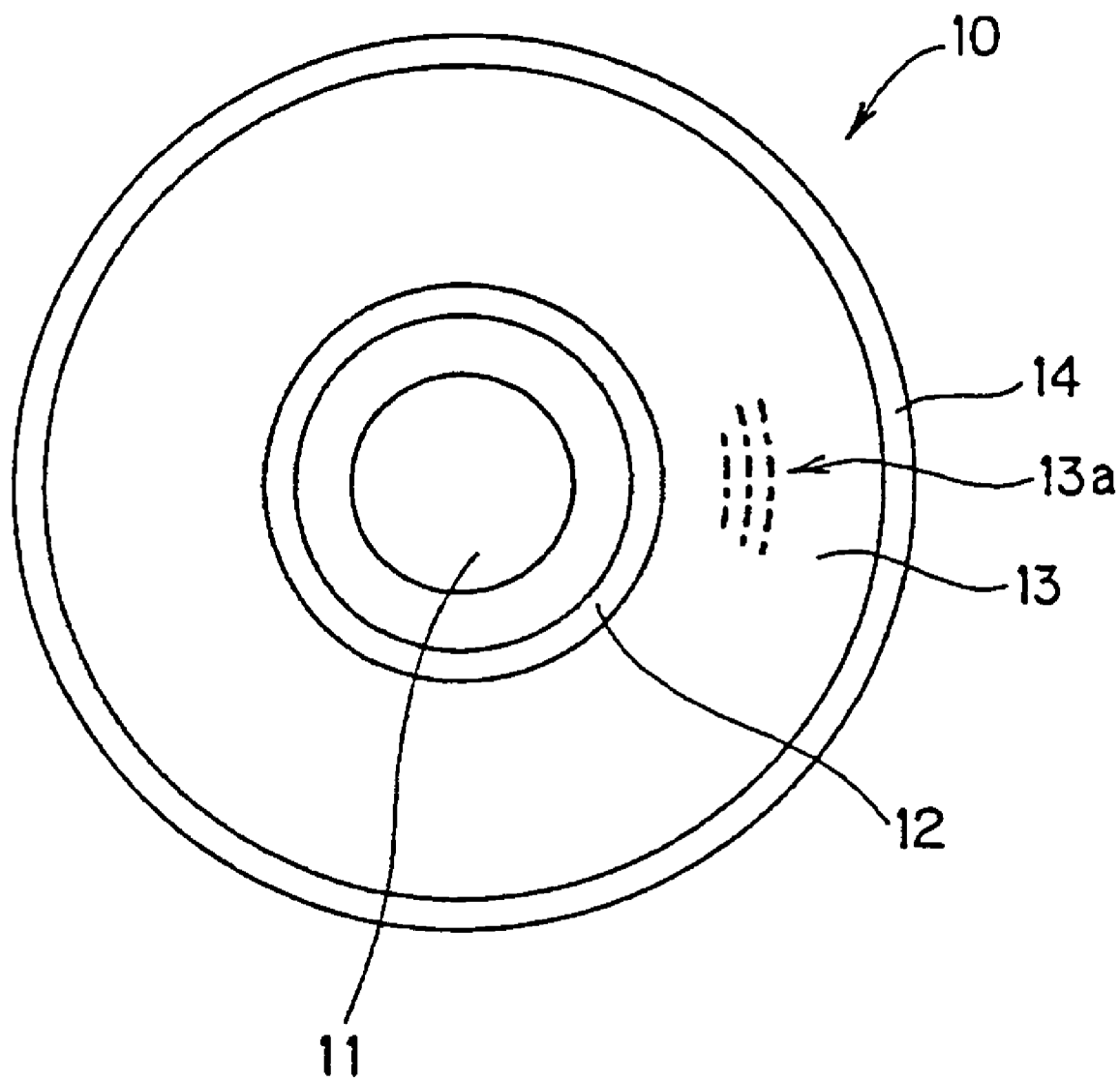
FIG. 1 is a schematic plan view showing the structure of an optical disk according to an embodiment of an information recording medium of the invention.
Figure 2A:
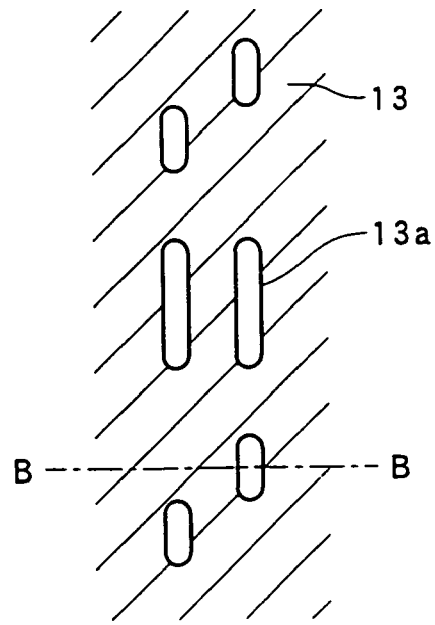
FIG. 2A is a partly enlarged plan view showing shapes of pits on the optical disk according to the embodiment of the information recording medium of the invention.
Figure 2B:
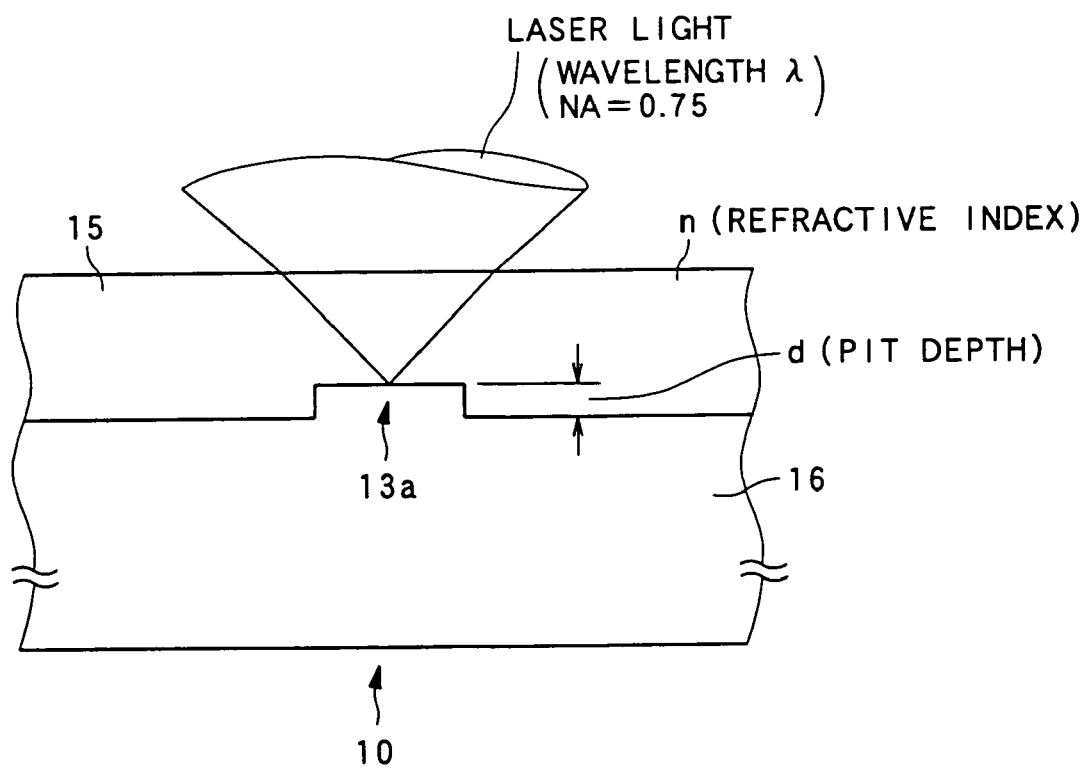
FIG. 2B is a sectional view taken along line B-B in FIG. 2A and showing a relationship between pit depth and optical beam.
Figures 3, 4:
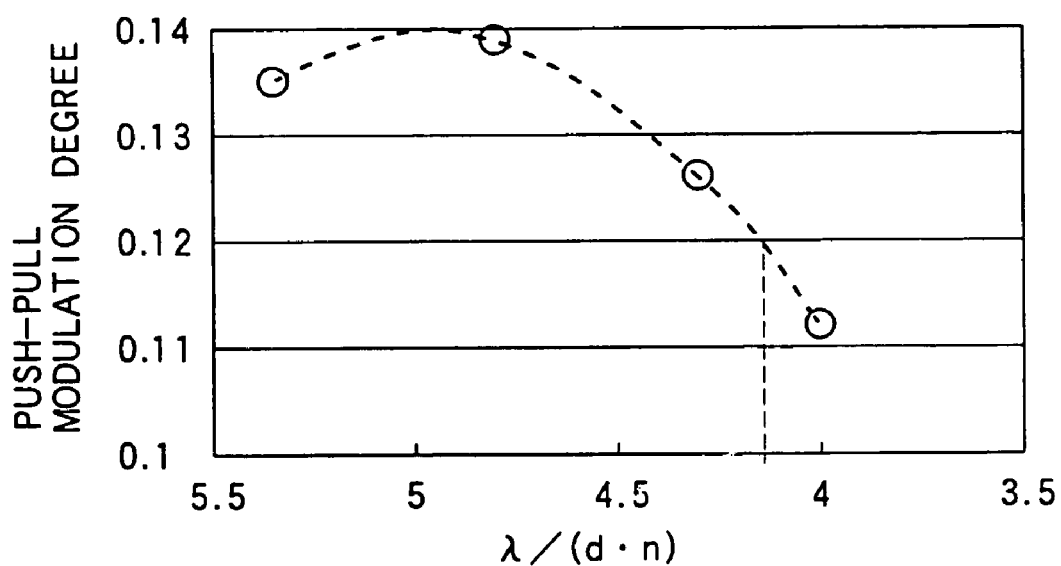
FIG. 3 is a table showing a classification according to upper and lower limits for pit depths.
FIG. 4 is a curve chart showing experimental data on push-pull modulation degrees and pit depths to study the upper limit for pith depths of the information recording medium of the invention.

Referring to FIGS. 1 to 3, an information recording medium according to the invention will now be described. FIG. 1 is a plan view showing the structure of an optical disk according to the embodiment of the information recording medium of the invention. FIG. 2 shows shapes of pits on the optical disk and a cross section of a pit. FIG. 3 is a table showing a classification according to upper and lower limits for the depth of pits adopted for the information recording medium of the invention.

A description will first be made of an application of the information recording medium of the invention to a disk form. Of course, the information recording medium is not limited to such a disk form, and it can be applied to any other form such as a tape or card.

As shown in FIG. 1, an optical disk 10 has a recording surface on a disk body of about 12 cm in diameter, for example, of the same size as a DVD. On the periphery of the recording surface, a lead-in area 12, a data area 13, and a lead-out area 14 are provided about a center hole 11 from the inner circumference to the outer circumference. If it is a ROM type disk, pits corresponding to information are pre-recorded in the data area 13 in a spiral or concentric shape about the center hole 11. On a recordable disk, information is recorded in a spiral or concentric shape. It should be noted that the invention is not limited to the structure with three divided areas.

In particular, the invention relates to the depth of pits 13a. The depth is determined by a trade-off between the level of a push-pull signal (push-pull error signal) used for servo application by a push-pull or differential push-pull method and the level of an RF signal as a reproduced signal of information. The shape of pit 13a is shown in FIG. 2A, for example. Pits 13a are arranged in data area 13 so that a length of each pit 13a and a distance between adjacent pits 13a corresponding to each piece of information are determined in conformity to its recording format. The cross section of a pit 13a is shown in FIG. 2B as a sectional view in line B-B in FIG. 2A. As shown, depression parts of a depth d are provided on the back side of a medium 15 on a substrate 16 (on the side of the medium 15 bordering the substrate 16). The depth d is set to be the optimum for the disk system with a refractive index n of the medium 15, a wavelength λ, and an optical system having an NA (Numerical Aperture) of 0.75.

As shown in FIG. 3, disks are classified into No. 1 to No. 4 by the depth of pits, and each range of pit depths has a combination of upper and lower limits for the pit depths. The disk most suitable for both the push-pull signal level and the level of the RF signal as the information reproduced signal is No. 4 disk, which has a lower limit of $\lambda/5.5n$ and an upper limit of $\lambda/4.7n$, that is, for which the depth d of pits is defined within the range of $\lambda/5.5n \leq d \leq \lambda/4.7n$. The second most suitable disk is No. 2 disk or No. 3 disk. No. 2 disk has a lower limit of $\lambda/5.5n$ and an upper limit of $\lambda/4.5n$, that is, for which the depth d of pits is defined within the range of $\lambda/5.5n \leq d \leq \lambda/4.5n$. No. 3 disk is the kind of disk that has a lower limit of $\lambda/8n$ and an upper limit of $\lambda/4.7n$, that is, that falls within the range of $\lambda/8n \leq d \leq \lambda/4.7n$. No. 1 disk has the widest standard with a $\lambda/8n$ lower limit and a $\lambda/4.5n$ upper limit, that is, it falls within the range of $\lambda/8n \leq d \leq \lambda/4.5n$.

It should be noted that the $\lambda/8n$ lower limit for No. 1 and No. 3 disks is the best condition for push-pull signals used in the conventional optical disks. Even if the introduction of this condition into the information recording medium of the invention causes a reduction in RF signal level, the reduction does not affect reproduction control of optical disks.

The defined ranges of pit depths have the advantage of realizing high-density and high-capacity, especially when introduced into ROM-type optical disks, but the ranges should be determined to consider all other factors or circumstances. The other factors or circumstances include conditions and capabilities of a reproduction apparatus used, conditions related to reproduction operation (e.g., a margin of error in a inclination angle between an optical pickup and an optical disk, and reproduction state changes such as a track jump), and manufacturing conditions for mass production of ROM type optical disks with information recorded on them (e.g., variations in optical disk thickness).

The following gives a detailed description on how to determine the depth d of pits based on various experimental data.

(Determination of Pit Depth)

Figures 5, 6:
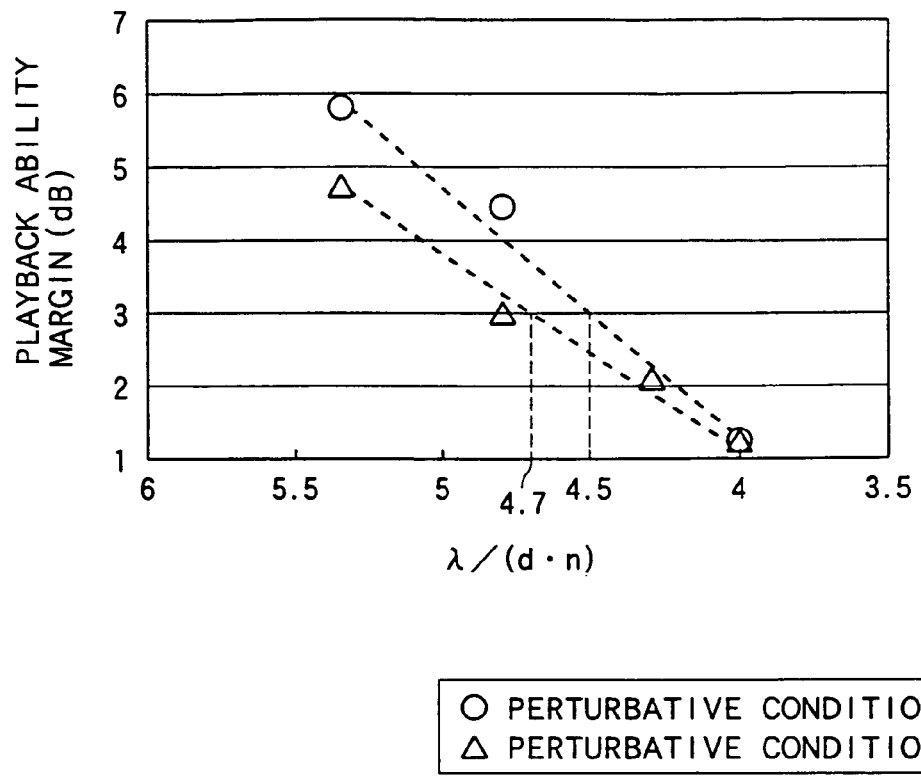
FIG. 5 is a line chart showing experimental data on playback ability margins and pit depths to study the upper limit for pit depths of the information recording medium of the invention.
FIG. 6 is a table listing experimental results of pit depths, push-pull modulation degrees, and playback ability margins.
Figure 7:
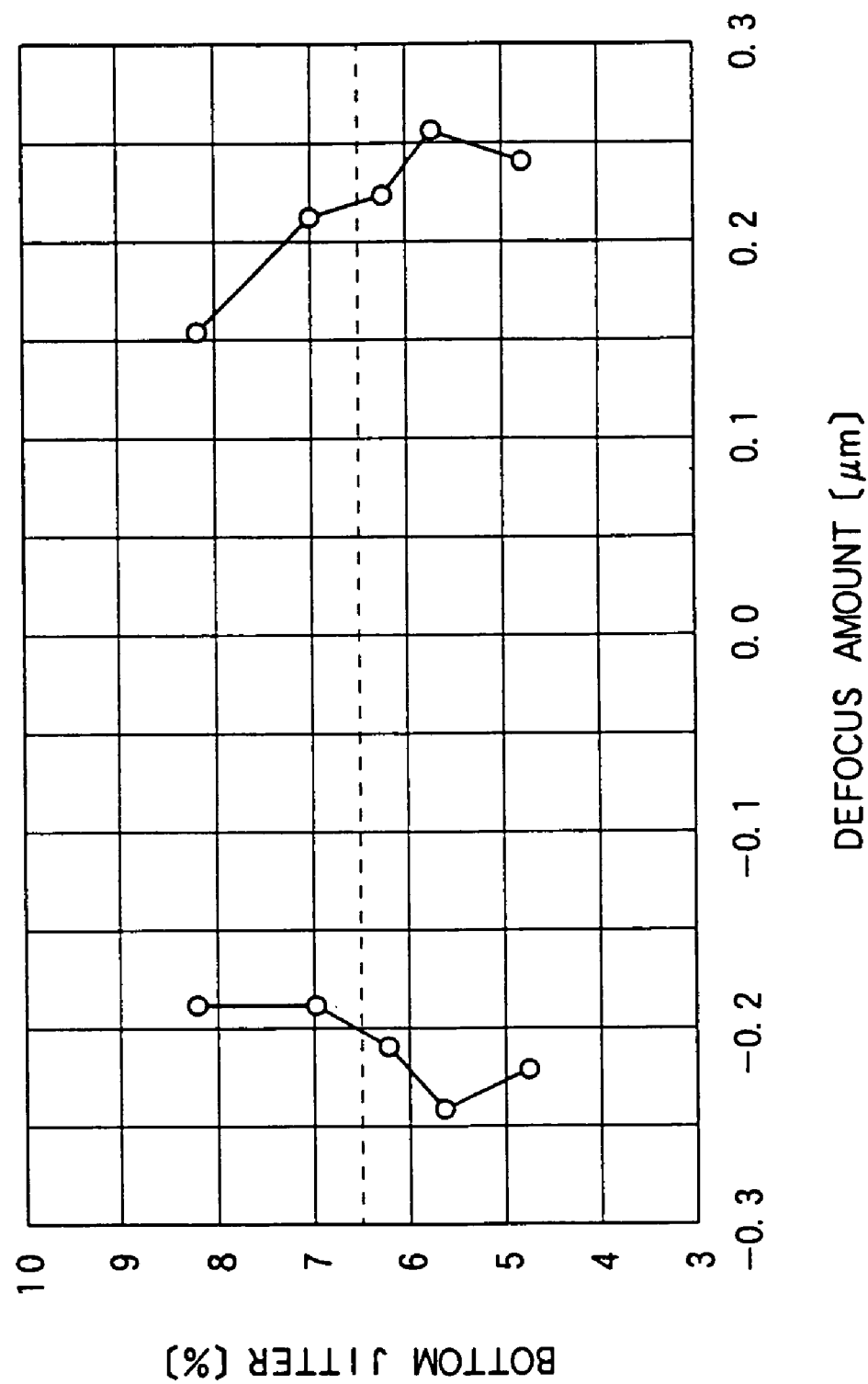
FIG. 7 is a chart showing experimental data on bottom jitter and defocus margins to study the lower limit for pit depths of the information recording medium of the invention.
Figure 8:
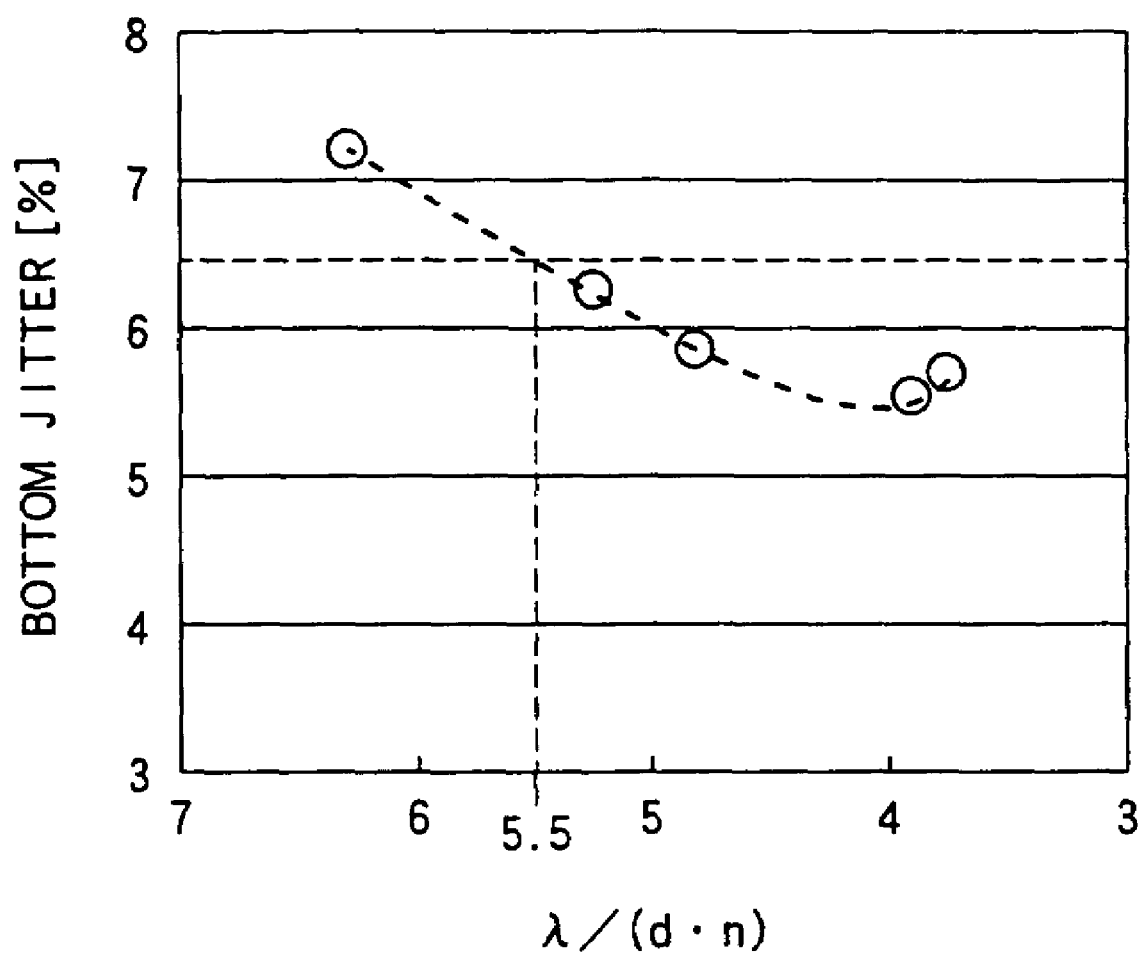
FIG. 8 is a curve chart showing experimental data on bottom jitter and pit depths to study the lower limit for pit depths of the information recording medium of the invention.

Referring next to FIGS. 4 through 8, a description will be made of how to determine the depth of pits for No. 1 to No. 4 disks classified. FIG. 4 shows experimental data on a relationship between push-pull modulation degree and pit depth to study the upper limit for the depth of pits on the information recording medium of the invention. FIG. 5 shows experimental data on a relationship between playback ability margin and pit depth to study the upper limit for the depth of pits. FIG. 6 is a table listing experimental results of pit depth, push-pull modulation degree, and playback ability margin. FIG. 7 shows experimental data on a relationship between bottom jitter and defocus margin to study the lower limit for the depth of pits on the information recording medium of the invention. FIG. 8 shows experimental data on a relationship between bottom jitter and pit depth to study the lower limit for the depth of pits.

The "push-pull modulation degree" denotes the ratio of push-pull signals to all the RF signals, and the "margin of playback ability" denotes a margin of servo gain until it becomes incapable of reproduction during replay of recorded data from an optical disk under certain conditions. The "bottom jitter" denotes the amount of jitter that could make it impossible to reconstruct signals correctly if more jitter had occurred. The "defocus margin" denotes a margin of error in the focus direction when the optical pickup picks up signals.

(Description on Upper Limit for Depth d of Pits)

(1) Explanation in terms of push-pull modulation degree.

FIG. 4 is a curve chart showing measured ratios of the total amplitude of push-pull signals to the total amplitude of all signals optically detected. The measurement is made without error in the alignment and angle between the optical disk and the optical pickup.

The ordinate indicates push-pull modulation degree and the abscissa indicates $\lambda/(d \times n)$ related to the depth d of pits. In other words, the following relation is given:

Push-Pull Modulation Degree=Push-Pull Amplitude P-P/ On-Track SUM Level.

The depth d of pits is determined from the following equation:

$$d=\lambda/(N \times n)[\text{therefore}, N=\lambda/(d \times n)],$$

where d is the depth of pits, $\lambda$ is the optical wavelength, n is the refractive index of the medium, N is a coefficient. Setting an optimum range of N ensures the optimum range of pit depths d.

It is desirable that the push-pull modulation degree to generate an error signal for servo application be 0.12 or more. In this case, it is apparent from FIG. 4 that $N=\lambda/(d \times n)$ is about 4.2 or more, that is, d takes on values of $\lambda/(4.2 \times n)$ or less. From the study on the push-pull modulation degree, it is derived that the upper limit for the depth d of pits is $\lambda/(4.2 \times n)$. Then, an actual optical wavelength $\lambda$ of a disk system used and an actual refractive index n of the medium are substituted into the equation to derive an actual value, for example, d=60 nm.

(2) Study from playback ability experiment.

The playback ability experiment is to judge whether replay is possible or not when there are errors in replay conditions, for example, various disk errors and relative errors between the optical disk and the optical pickup. These conditions are referred to as perturbative conditions.

The experiment was made under the following two perturbative conditions:

| <Perturbative Condition A> | |
|---|---|
| Defocus: | +/−0.2 μm |
| Error in Thickness: | +/−2 μm |
| Radial Tilt Angle: | 0.5 deg. |
| Tangential Tilt Angle: | 0.3 deg. |
| <Perturbative Condition B> | |
| Defocus: | +/−0.2 μm |
| Error in Thickness: | +/−4 μm |
| Radial Tilt Angle: | 0.44 deg. |
| Tangential Tilt Angle: | 0.2 deg. |

The "defocus" denotes an error in the depth of focus, and the "error in thickness" denotes an error resulting from variations in medium thickness. Further, the "radial tilt angle" denotes a tilt angle of the optical disk in the radial direction, and the "tangential tilt angle" denotes a tilt angle of the optical disk in the tangential direction of the track on the optical disk.

<Playback Ability Experimental Conditions>

Three kinds of experiments below were made under the above-cited perturbative condition A and perturbative condition B, respectively.

1. Repeat tracking on and off and confirm whether switching from OFF to ON is done with reliability. In this case, tracking servo is performed by the DPP (Differential Push-Pull) method.

2. Repeat the replay of a still image, that is, repeat the same track, and confirm whether repetitive replays are made with reliability.

3. One track reverse jump. That is, make a one-track jump from a track to the immediately preceding track and confirm whether the jump is made with reliability. For the jump operation, a normal kick-and-brake jump method is used. This experiment condition is stricter than the above two playback ability experimental conditions.

<Results of Playback Ability Experiments>

It is confirmed that these three playback ability experiments respectively made under the above-cited perturbative conditions show that all the operations are completed successfully. Then, in order to check the degree of stability in the reproduction operation of the apparatus under respective perturbative conditions, we reduce tracking servo gain under the perturbative conditions to measure the amount of gain reduction that causes the failure of each playback ability experiment. FIG. 5 shows the results as playback ability margins. In FIG. 5, the ordinate expresses the playback ability margins in decibels (dB), and the abscissa expresses $\lambda/(d=n)$ related to the depth d of pits.

FIG. 6 lists all the results of the experiment on the push-pull modulation degree and the playback ability experiments using pit depths d as parameters. Playback ability margin A represents results of the playback ability experiments under perturbative conditions A, and playback ability margin B represents results of the playback ability experiments under perturbative conditions B. The push-pull modulation degree takes on dimensionless numbers. On the other hand, the rows of playback ability margin A and playback ability margin B express playback ability margins in decibels (dB). The table lists numerical values actually measured for each of pit depths d, and these numerical values are used to consider a specific value suitable for the upper limit for the depth d of pits.

Suppose here that the aforementioned three playback ability experimental conditions respectively experimented under the above-cited perturbative conditions occur in normal use. If a margin of gain about 3 dB is set as the margin of playback ability to ensure stable operation of the apparatus, since it is apparent from FIG. 5 that $\lambda/(d \times n)=4.5$ or more under perturbative conditions A, the upper limit for the depth d of pits is $\lambda/(4.5 \times n)$. On the other hand, since $\lambda/(d \times n)=4.7$ or more under perturbative conditions B, the upper limit for the depth d of pits is $\lambda/(4.7 \times n)$.

The studies from the push-pull modulation degree and the playback ability experiments show that the upper limit for the depth d of pits preferably takes on values determined from $\lambda/(4.5 \times n)$, and more preferably, values determined from $\lambda/(4.7 \times n)$.

(Description on Lower Limit for Pit Depth)

The lower limit for pit depths is determined from a study on bottom jitter. The "bottom jitter" denotes the amount of jitter that could make it impossible to reconstruct signals correctly if more time-base deflection of reproduced signals, that is, more jitter had occurred in the optical disk apparatus. In order to determine the bottom jitter in the reproduction system of the optical disk apparatus (that is, to determine the lower limit for pit depths as a result)), it is necessary to consider certain factors such as defocus amount, error in disk thickness, radial tilt, and tangential tilt. Among them, although the defocus amount has the biggest effect on the bottom jitter, these factors are not independent of each other, and they affect each other's margins.

FIG. 7 shows measurements of bottom jitter and defocus amount obtained by applying a predetermined radial tilt, tangential tilt, and error in disk thickness as the most significant factors under requested perturbative conditions in view of the relationship between defocus and bottom jitter. The actually measured values are plotted as a relationship between bottom jitter and defocus amount of a limit for signal reconstruction under the perturbative conditions. The abscissa indicates defocus amount and the ordinate indicates bottom jitter. Considering the defocus amount as a key determinant of the system margin under the perturbative conditions, FIG. 7 shows that signals can be reconstructed with 6.5-percent bottom jitter or less under the above-mentioned perturbative conditions and with a defocus amount of +/−0.2 μm.

FIG. 8 shows a relationship between jitter amount and pit depth d as a result of cumulative manufacturing margins during the manufacturing process of optical disks from mastering to stamper making or disk molding. As can be seen from FIG. 7, if the bottom jitter falls within a 6.5-percent range, since the pit depth d is determined from $d=\lambda/(N \times n)$, the lower limit is determined as $d=\lambda/(5.5 \times n)$ from FIG. 8 that shows N=5.5 or less determined from $N=\lambda/(d \times n)$. It should be noted that $\lambda/8n$ or shallower pit depths are detrimental to the system margin because they reduce RF signal output to make it impossible to ensure the system margin.

As discussed above in detail, the depth d of pits on the information recording medium according to the invention falls within the range of $\lambda/8n \leq d \leq \lambda/4.5n$, preferably within the range of $\lambda/8n \leq d \leq \lambda/4.7n$, and more preferably within the range of $\lambda/5.5n \leq d \leq \lambda/4.5n$.

The following describes the push-pull modulation degree when tapered pits are formed on the substrate. In this case, the shape of each pit may also be either a projection or depression.

Figure 11A:
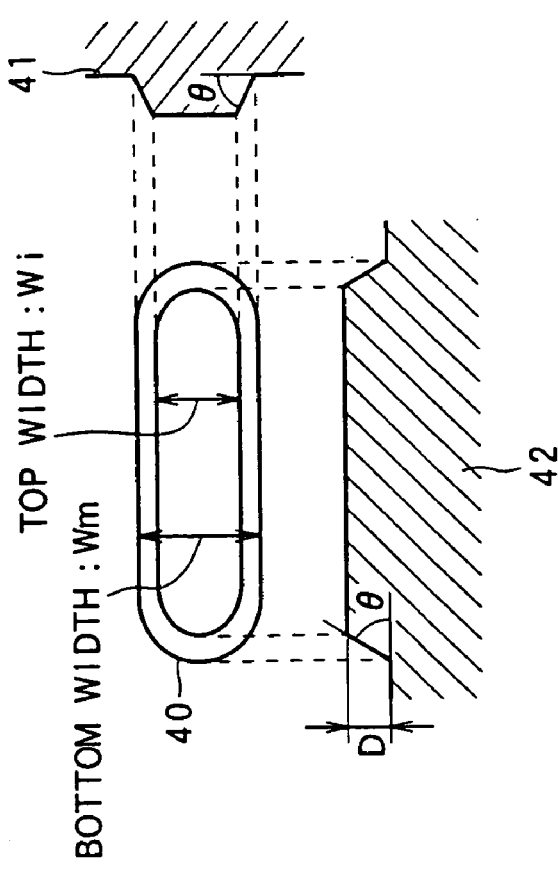
FIG. 11A shows shapes of a depressed pit.
Figure 11B:
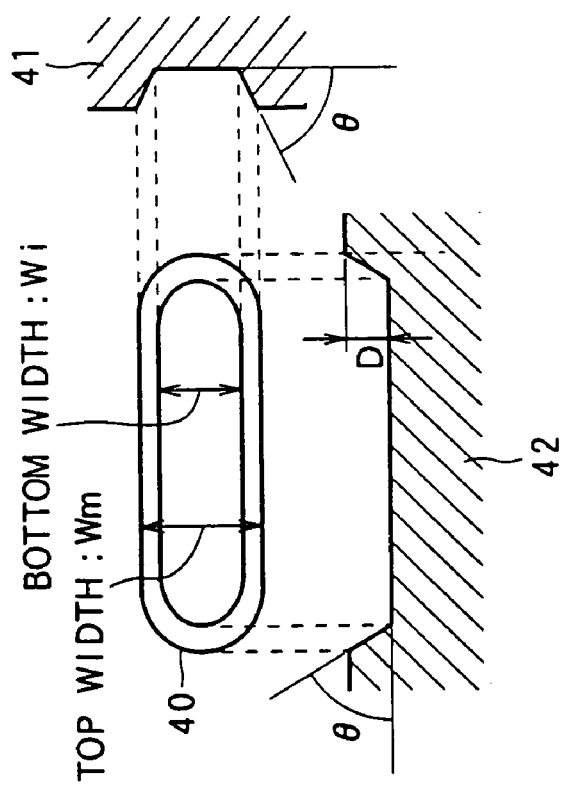
FIG. 11B shows shapes of a projected pit.

As shown in FIG. 10, it is found that the push-pull modulation degree with respect to the pit depth [nm] depends on the taper angle. In other words, the above-mentioned range of pit depths d can vary with the taper angle. FIG. 11 shows dimensions of tapered pits. In FIG. 11A represents a depressed pit, which has a top width Wm and a bottom width Wi (Wm>Wi), and a taper angle θ as shown in a cross section 41 in the disk radial direction and a cross section 42 in the disk tracking direction. Further, FIG. 11B represents a projected pit, which has a top width Wi and a bottom width Wm (Wm>Wi), and the same taper angle θ as that of FIG. 11A.

The occurrence of a taper is a fairly common in the actual process of pit formation, and the push-pull modulation degree with respect to the pit depth (nm) varies with the taper angle θ. To eliminate the dependency of the push-pull modulation degree on the taper angle θ, the invention introduces the idea of an apparent pit depth as follows.

If the average width of a pit is W [nm], the taper angle of the pit is θ (deg.), and the actual depth of the pit is D [nm], the depth d of the pit is defined as an apparent depth given by:

$$d = W \times D/(W + D/\tan \theta).$$

Figure 12:
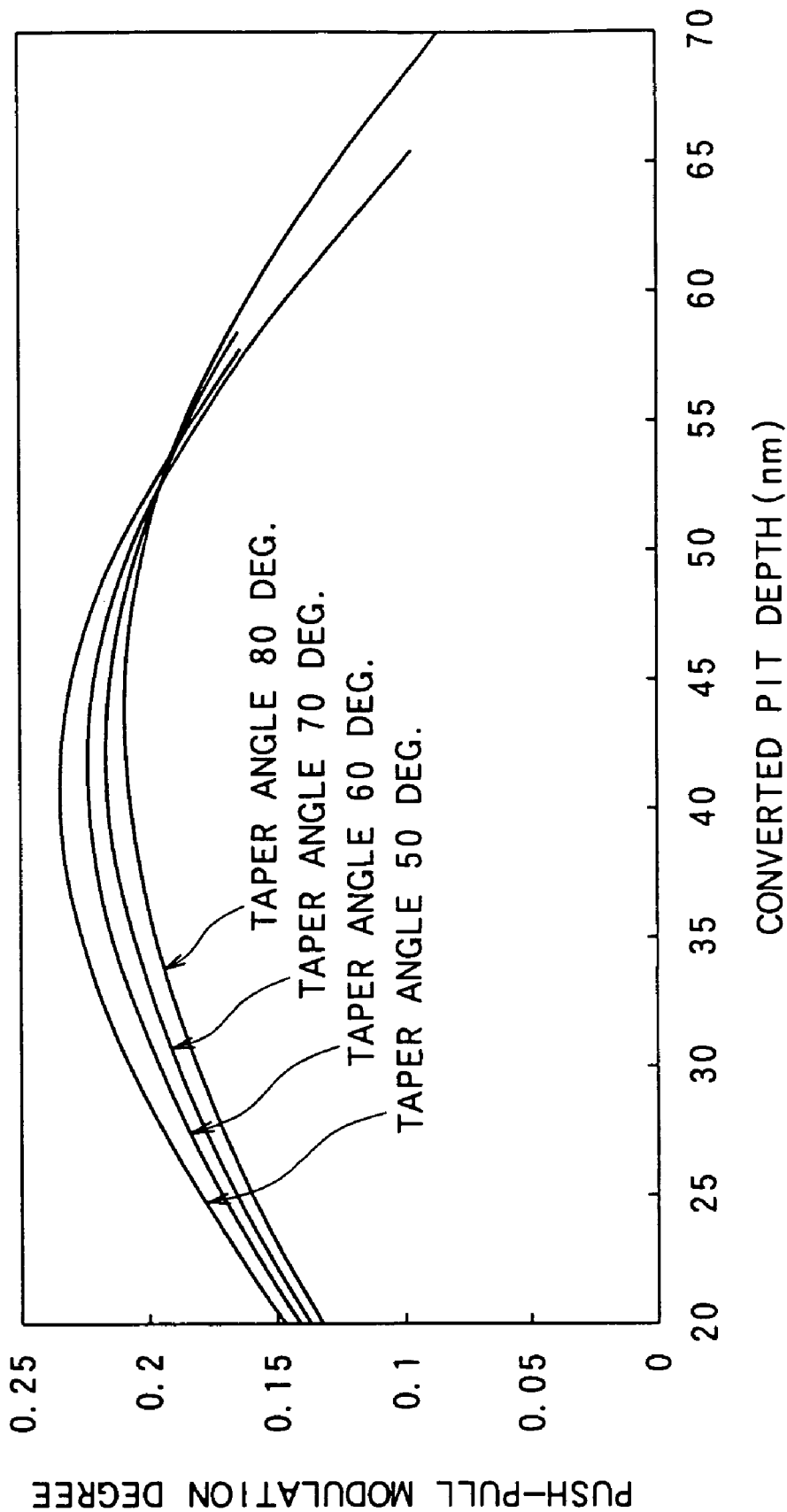
FIG. 12 is a curve chart showing a relationship between converted pit depth and push-pull modulation degree when choosing taper angles as parameters.

It is apparent from FIG. 12 that this definition substantially eliminates the dependency of the push-pull modulation degree with respect to the converted pit depth [nm] on the taper angle. A comparison between FIG. 12 and FIG. 10 makes it clearer.

Figure 13:
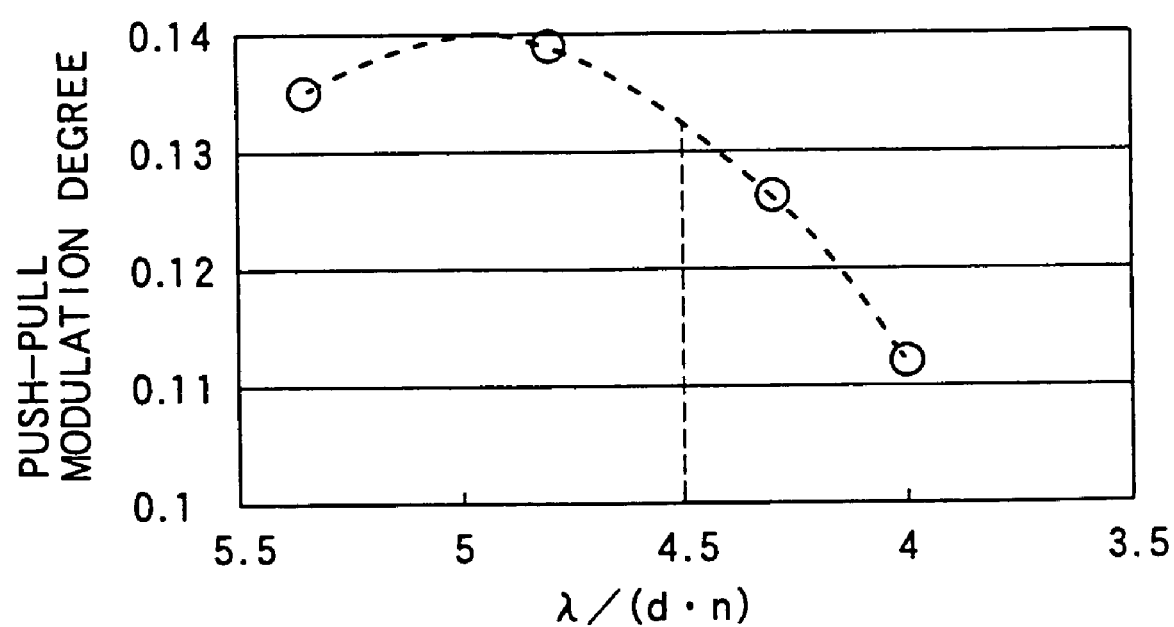
FIG. 13 is a curve chart showing push-pull modulation degrees and pit depths to study the upper limit of pit depths.

Therefore, the introduction of the above-defined pit depth d makes it possible to set the optimum range of pit depths d without the need to consider the taper angle of the pits. FIG. 13 is a curve chart indicating $\lambda/(d\times n)$ on the abscissa and the push-pull modulation degree on the ordinate. Since the pit depth d falls within the range of $\lambda/5.5n \leq d \leq \lambda/4.5n$, it is apparent from FIG. 13 that it is essential only that the push-pull modulation degree be 0.13 or more.

(Embodiment of Information Recording/Reproducing Apparatus)

Figure 9:
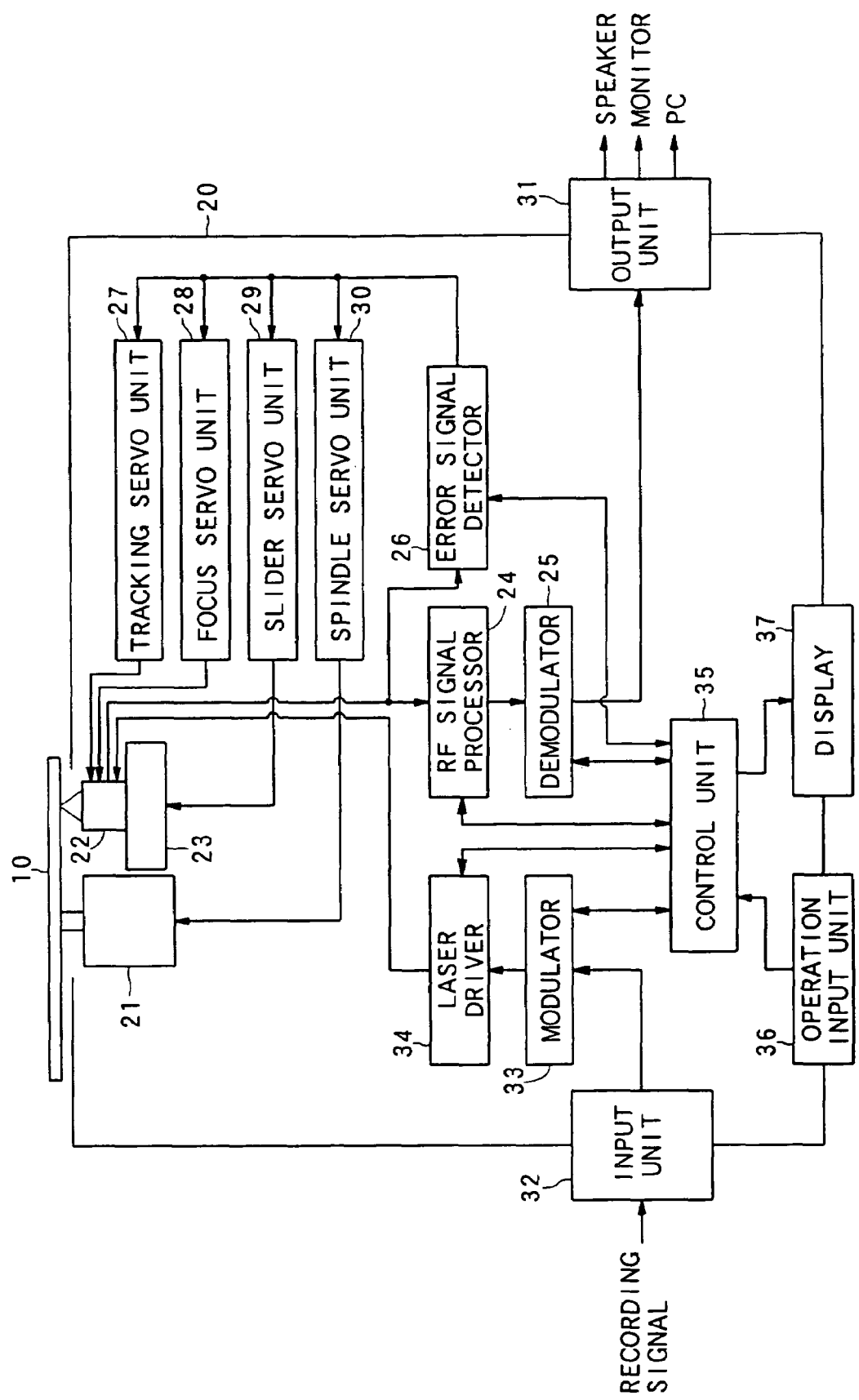
FIG. 9 is a block diagram for explaining the structures of an information recording apparatus, an information reproducing apparatus, and an information recording/reproducing apparatus according to the invention.

Referring to FIG. 9, an embodiment of an information recording/reproducing apparatus of the invention will be described. It should be noted that an information reproducing apparatus of the invention is constituted of information reproducing features of the information recording/reproducing apparatus, and an information recording apparatus of the invention is constituted of information recording features of the information recording/reproducing apparatus.

The information recording/reproducing apparatus 20 reproduces recorded information from an optical disk 10 having a pit width d, and records information in pits with the depth d. The information recording/reproducing apparatus 20 includes a spindle motor 21, an optical pickup 22, a slider 23, and the like as a mechanical section. It also includes an RF signal processor 24, a demodulator 25, a modulator 33, a laser driver 34, and the like as a signaling system. Further, it includes an error signal detector 26, a tracking servo unit 27, a focus servo unit 28, a slider servo unit 29, a spindle servo unit 30, and the like as a servo system. In addition, an output unit 31, an input unit 32, an operation input unit 36, a display 37, and the like are included as an interface system, and a control unit 35 is provided for control of each of the above-cited components.

The spindle motor 21 drives the optical disk 10 loaded in the drive to rotate at a predetermined speed of rotation, that is, at a predetermined RPM, or at a predetermined linear speed. The rotation is controlled as follows: The error signal detector 26 detects a rotational error from reproduced signals based on various sync signals, and the spindle servo unit 30 generates a control signal based on the rotational error to input the control signal into the spindle motor 21.

The optical pickup 22 is a device for reading or writing information from or to the optical disk 10. The optical pickup 22 may be commonly used for reading and writing, or separate optical pickups may be provided for reading and writing, respectively. The laser wavelength $\lambda$ used here is about equivalent to a wavelength of blue laser, for example, and the NA (Numerical Aperture) is about 0.75. Under these conditions, about 25-GB information can be recorded on the optical disk 10.

The optical pickup 22 focuses a laser beam on a pit 13b of the optical disk 10 and detect the reflected light to read the information, so that it is necessary to focus the laser beam on the pit 13b and follow the track, and hence to control the focus position of the laser beam in both the focus and tracking directions. The focus and tracking control is carried out as follows: The error signal detector 26 detects focus and tracking errors from signals reproduced at the optical pickup 22, and the focus servo unit 28 and the tracking servo unit 27 generate respective control signals based on the detected errors to input the control signals into the optical pickup 22.

In particular, in the embodiment, the error signal detector 26 generates a push-pull signal (that is, a push-pull error signal or tracking error signal) as one of the control signals by a push-pull or differential push-pull method, and the tracking servo unit 27 performs tracking servo based on the push-pull signal. In the embodiment, since the pit depths of the optical disk 10 meets the above-mentioned condition of $\lambda/8n \leq d \leq \lambda/4.5n$, a push-pull signal of sufficient magnitude can be generated, enabling high-performance tracking.

The tracking control may also be performed by controlling the position of the slider 23 in the disk radial direction.

The slider 23 is a feed mechanism for moving the optical pickup 22 in the radial direction of the optical disk 10. The slider 23 moves the optical pickup to a target position rapidly. For example, it is common to use such a mechanism that a base stage loading the optical pickup 22 is moved by means of a screw. The slider 23 controls the position of the optical pickup 22 not only by moving the optical pickup 22 to the target position rapidly, but also by feeding the optical pickup 22 slowly from the inside to the outside of the optical disk 10 as reproduction progresses. This control is carried out as follows: The error signal detector 26 detects a cumulative tracking error (a direct current component of the tracking error) from reproduced signals, and the slider servo unit 29 generates a control signal based on the detected error to input the control signal into the slider 23.

The RF signal processor 24 performs wave-shaping of RF signals reproduced by the optical pickup 22 so that the wave-shaped signals will be suitable for downstream signal processing. In particular, in the embodiment, since the pit depths of the optical disk 10 meets the condition of $\lambda/8n \leq d \leq \lambda/4.5n$, an RF signal of sufficient magnitude can be generated. It ultimately allows reproduction at a high S/N (Signal to Noise) ratio.

The demodulator 25 demodulates signals from the signals subjected to upstream processing at the RF signal processor 24, that is, it returns the signals to the original information based on the modulated format. The demodulator 25 also has an error correction function, so that when the information demodulated from the signals is audio information, picture information, or data information, the demodulator 25 outputs the information through the output unit 31 to a speaker, a monitor, or a personal computer, respectively.

The modulator 33 converts signals, which are inputted as recording signals from the input unit 32, into a predetermined format to generate recording signals. The modulator 33 also performs signal processing for error correction. The signals modulated to the recording signals are inputted into the laser driver 34 to modulate the laser beam from the optical pickup 22. Then the modulated laser beam is irradiated on the optical disk 10 to record the information.

The control unit 35 includes a CPU and the like. The control unit 35 controls the entire operation of the information recording/reproducing apparatus 20 based on information from each of the functional units and operation instructions from the operation input unit 36, and displays the operational state of the information recording/reproducing apparatus 20 on the display 37. The operation input unit 36 may be provided with the form of a certain mechanical input device or a remote control. The display 37 may be a CRT, a LCD, an EL display, or the like.

As described about the structure of the information recording/reproducing apparatus, the information reproducing apparatus can be constituted of systems other than the input unit 32, the modulator 33, and the laser driver 34. On the other hand, the information recording apparatus can be constituted of systems other than the RF signal processor 24, the demodulator 25, and the output unit 31. Further, instead of controlling the intensity of laser light to form pits of the depth d that falls within the range defined by the invention, the thickness of a recording layer as a medium may be made equal to the pit depth d to form a multilayer structure of the recording layer and the substrate so that the recording layer will be completely blown off during recording.

The structure of the information recording/reproducing apparatus is not limited to the above-described structure, and any other structure is possible as long as it can reproduce and record information from and on the optical disk based on the conditions for the pit depth according to the invention.

Further, the invention is not limited to the above-mentioned embodiments, and appropriate changes and modifications are possible without departing from the scope or spirit of the invention as read throughout the claims and the specification. Any other information recording medium, information recording apparatus, information reproducing apparatus, and information recording/reproducing apparatus associated with such changes are included as technical features of the invention.

As described above in detail, according to the invention, an RF signal and a push-pull signal of magnitude enough for an optical disk apparatus using an optical system with a NA of 0.75 or greater can be generated, thereby realizing an information recording medium for high recoding density and high recording capacity. The invention can also realize an information reproducing apparatus, an information recording apparatus, and an information recording/reproducing apparatus suitable for reproduction or recording of information from or on such an information recording medium.

The entire disclosure of Japanese Patent Application No. 2002-115329 filed on Apr. 17, 2002 and Japanese Patent Application No. 2002-163416 filed on Jun. 4, 2002 including the specification, claims, drawings and summary is incorporated herein by reference in its entirety.

What is claimed is:

1. An information recording medium, which is irradiated with an optical beam through an optical system with an NA of 0.75 or greater to reproduce information and record the information on a recording part as pits, wherein if the optical wavelength of the optical beam is $\lambda$, the refractive index of the recording part is n, and the depth d of the pits is d, the depth d of the pits falls within a range of a lower limit of $\lambda/5.5n$ to an upper limit of $\lambda/4.5n$ represented as:

$\lambda/5.5n \leq d \leq \lambda/4.5n$, wherein a push-pull modulation degree with respect to the pits is 0.12 or more.

2. The information recording medium according to claim 1, wherein the upper limit for the depth d of the pits is set to:

$d=\lambda/4.7n$.

3. The information recording medium according to claim 1, wherein if the average width of the pits is W [nm], the taper angle of the pits is $\theta$[deg.], and the actual depth of the pits is D [nm], the depth d of the pits is determined as an apparent depth represented as:

$d=W \times D/(W+D/\tan\theta)$.

4. The information recording medium according to claim 1, wherein a bottom jitter is set 6.5 percent or less with respect to a defocus amount of +/−0.2 μm.

5. The information recording medium according to claim 1, wherein a tracking servo is performed by a push-pull method.

6. An information reproducing apparatus for reproducing information recorded on the information recording medium which is irradiated with an optical beam through an optical system with an NA of 0.75 or greater to reproduce information and record the information on a recording part as pits, wherein if the optical wavelength of the optical beam is $\lambda$, the refractive index of the recording part is n, and the depth d of the pits is d, the depth d of the pits falls within a range of a lower limit of $\lambda/5.5n$ to an upper limit of $\lambda/4.5n$ represented as: $\lambda/5.5n \leq d \leq \lambda/4.5n$, wherein a push-pull modulation degree with respect to the pits is 0.12 or more, the apparatus comprising:

a reproduction optical device for irradiating the recording part with an optical beam for reproduction through the optical system with the NA of 0.75 or greater and receiving light from the recording part based on the optical beam;

a reproduction control device for controlling the reproduction operation of the reproduction optical device; and a signal demodulating device for demodulating a light-receiving signal generated by the reproduction optical device.

7. The information reproducing apparatus according to claim 6, wherein the reproduction control device further comprises a tracking servo device for performing tracking servo based on the light-receiving signal generated by the reproduction optical device.

8. The information reproducing apparatus according to claim 7, wherein the tracking servo device performs tracking servo by a push-pull or differential push-pull method.

9. An information recording apparatus for recording information on the information recording medium which is irradiated with an optical beam through an optical system with an NA of 0.75 or greater to reproduce information and record the information on a recording part as pits, wherein if the optical wavelength of the optical beam is $\lambda$, the refractive index of the recording part is n, and the depth d of the pits is d, the depth d of the pits falls within a range of a lower limit of $\lambda/5.5n$ to an upper limit of $\lambda/4.5n$ represented as: $\lambda/5.5n \leq d \leq \lambda/4.5n$, wherein a push-pull modulation degree with respect to the pits is 0.12 or more, the apparatus comprising:

a recording optical device for irradiating the recording part with an optical beam for recording through the optical system with the NA of 0.75 or greater;

a signal modulating device for converting an information signal, indicative of information to be recorded, into a recording signal; and a recording control device for inputting the recording signal converted by the signal modulating device into the recording optical device to control the recording operation.

10. An information recording/reproducing apparatus for recording and reproducing information on and from the information recording medium which is irradiated with an optical beam through an optical system with an NA of 0.75 or greater to reproduce information and record the information on a recording part as pits, wherein if the optical wavelength of the optical beam is $\lambda$, the refractive index of the recording part is n, and the depth d of the pits is d, the depth d of the pits falls within a range of a lower limit of $\lambda/5.5n$ to an upper limit of $\lambda/4.5n$ represented as: $\lambda/5.5n \leq d \leq \lambda/4.5n$, wherein a push-pull modulation degree with respect to the pits is 0.12 or more, the apparatus comprising:

a recording/reproduction optical device, which irradiates the recording part with an optical beam for reproduction through the optical system with the NA of 0.75 or greater and receives light from the recording part based on the optical beam to generate a light-receiving signal during reproduction, and irradiates the recording part with an optical beam for recording during recording;

a reproduction control device for controlling the reproduction operation of the recording/reproduction optical device;

a signal demodulating device for demodulating the light-receiving signal generated by the recording/reproduction optical device;

a signal modulating device for converting information signal, indicative of information to be recorded, into a recording signal; and a recording control device for inputting the recording signal converted by the signal modulating device into the recording/reproduction optical device to control the recording operation.

* * * * *